W. T. HOWARD.
Gridiron.
No. 113,886. Patented Apr. 18, 1871.
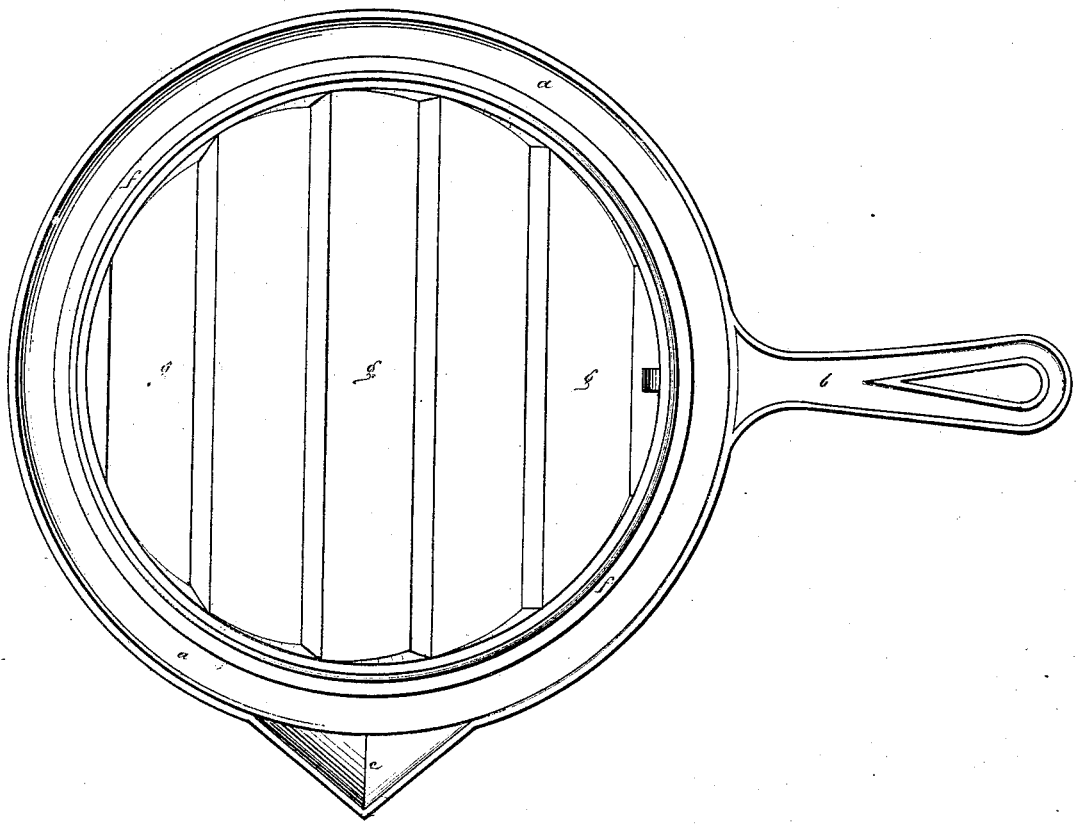

United States Patent Office.

WILLIAM THOMPSON HOWARD, OF BALTIMORE, MARYLAND.

Letters Patent No. 113,886, dated April 18, 1871.

IMPROVEMENT IN BROILERS.

The Schedule referred to in these Letters Patent and making part of the same.

*To all whom it may concern:*

Be it known that I, WILLIAM THOMPSON HOWARD, of Baltimore, in the county of Baltimore and State of Maryland, have invented a new and improved Steak-Broiler; and I do hereby declare the following to be a full, clear, and exact description of the same, reference being had to the accompanying drawing making a part of this specification, in which—

Figure 1 is a sectional elevation, and

Figure 2 is a plan view.

This invention relates to that class of steak-broilers in which two sets of parallel horizontal bars are employed, one to support the meat and the other to conduct the juices which exude therefrom into an annular trough or other suitable receptacle.

Hitherto, so far as I am aware, no broiler has been provided with bars, which, while arranged to conduct the grease or juices of the meat into grooved bars beneath them, have also admitted heated air and flame into direct contact with every part of the surface of the same. There has always remained some obstructing portion of the superior bars, and hence the best effects have not been attained, since no skill or experience of the cook could avail to remedy the inevitable result of allowing heat or flame full or free access to one part of a steak while the other was being subjected to the reflected heat of the bars on which it rested.

To remedy this is the object of my invention, and in carrying it out I arrange the horizontal knife-edged steak-bars at an inclination of forty-five degrees or thereabout, and in such relation to the parallel grooved bars beneath as to conduct the exuded juices of the meat into them, and otherwise construct the respective parts as hereinafter more fully set forth.

Referring to the drawing—

*a* is an annular vessel having a handle, *b*, and a spout, *c*, and provided with transverse parallel bars *d*, grooved lengthwise of their upper sides, which grooves open at each end into the annular vessel *a*.

*e* is the ring of the broiler proper, the same resting on the top of the inner side of the annular vessel *a*, and being provided with a flange, *f*, which passes down a little way into said vessel and holds the broiler in place thereon.

*g* are the parallel broiler-bars placed transversely of the ring *e*, and secured to the inside thereof at their ends in any suitable manner, said broiler-bars being all so inclined that one edge of each is considerably higher than the other, the bars being chamfered at their upper edges so as to present narrow surfaces nearly level, on which surfaces, and on these only, the meat rests, all the rest of its exterior being exposed directly to the action of heat.

The lower edges of the bars *g* are immediately above the grooved bars *d*, so that all the fat and gravy that issues from the meat drops directly into the grooved bars and runs thence into the vessel *a*.

There being an interval, *h*, between each bar *d* and the bar *g* above it, the heat has two avenues of access past each bar *g* to the meat.

Having thus described my invention,

What I claim as new, and desire to secure by Letters Patent, is—

In a steak-broiler, the broad knife-edged bars *g g*, inclined as specified, and arranged with relation to the parallel grooved bars *d d*, as herein shown and described, whereby the heat and flame are allowed free access to the entire surface of the meat, while the juices thereof are conducted into the annular trough *a*, as set forth.

WM. T. HOWARD.

Witnesses:
SOLON C. KEMON,
THOS. D. D. OURAND.